Figure 1:
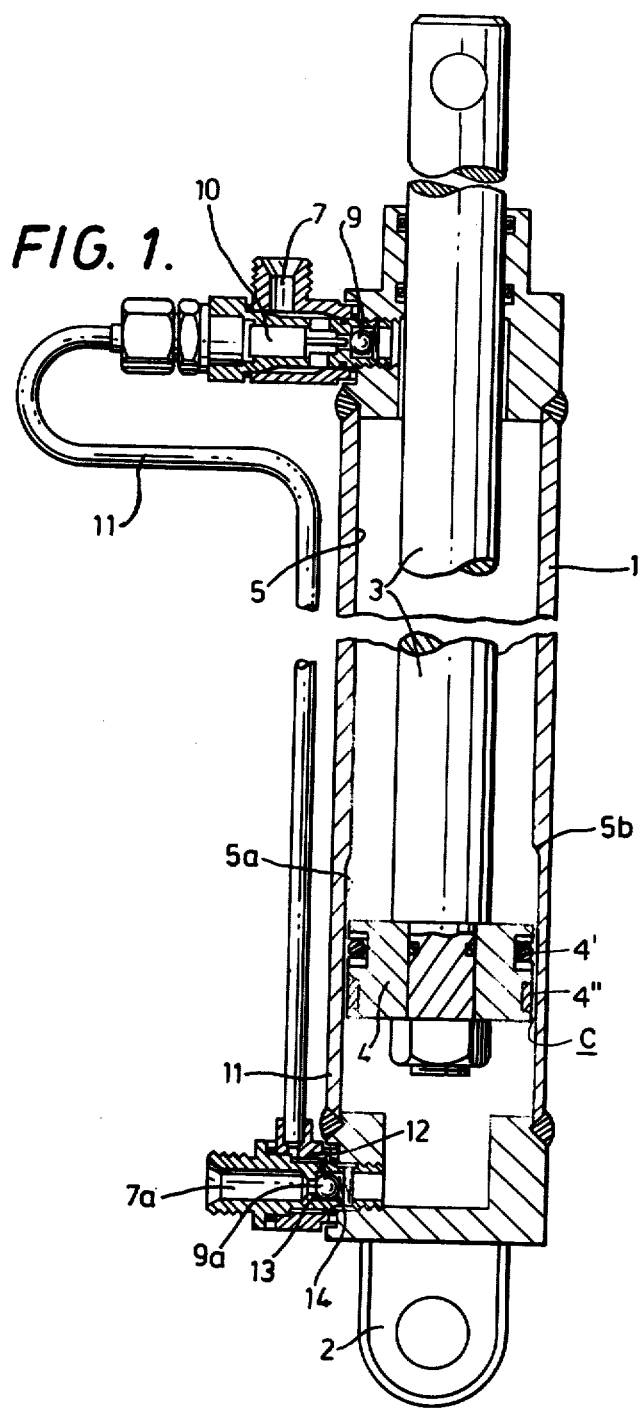

United States Patent [19]

Hudston et al.

[11] 3,972,557
[45] Aug. 3, 1976

[54] HYDRAULIC CAB-TILTING SYSTEMS

[75] Inventors: Michael R. Hudston, Ingham; Henry J. Levington, Snelland, both of England

[73] Assignee: Clayton Dewandre Company Limited, Lincoln, England

[22] Filed: Oct. 25, 1974

[21] Appl. No.: 517,963

[30] Foreign Application Priority Data
Oct. 31, 1973  United Kingdom............... 50585/73

[52] U.S. Cl............................... 296/35 R; 91/399; 180/89 A; 91/420
[51] Int. Cl.².......................................... B62D 23/00
[58] Field of Search............. 296/28 C, 35 A, 35 R, 296/28 R; 180/89 A; 188/316; 91/416, 399, 162 R, 420; 254/93 R, 93 VA

[56]  References Cited
UNITED STATES PATENTS
3,229,589  1/1966  Langas................................ 91/416
3,322,393  5/1967  Neilson et al..................... 254/93 R
3,472,547  10/1969  London............................ 180/89 A Primary Examiner—Albert J. Makay
Attorney, Agent, or Firm—Norris & Bateman

[57]  ABSTRACT

A hydraulic ram system for tilting the cab of a large commercial vehicle to provide access to the engine and other mechanism, where the end of the ram cylinder in which the ram piston is located when the cab is in the lowered position is of increased bore diameter and provides enough clearance around the piston to render the ram passive in this position, and the length of the increased diameter portion of the cylinder bore is sufficient to accommodate the maximum movement of the cab on its suspension.

7 Claims, 5 Drawing Figures

HYDRAULIC CAB-TILTING SYSTEMS

The cabs of present-day large commercial vehicles are often so mounted that they can be tilted to provide access to the engine and other mechanism, the usual tilting means comprising a hydraulic ram or jack together with associated actuating and control means, i.e. a manually-operable plunger pump, a control valve, a reservoir and appropriately positioned relief, check and/or anti-cavitation valves, and hereinafter referred to as a hydraulic ram system of the kind described. A known cab tilt control system is disclosed in U.S. Pat. No. to London 3,472,547.

As a safeguard against unintentional falling of the cab when in a tilted position, it is common practice to fit flow restrictors in the ram ports and so limit the speed at which the ram piston can move, or to fit lock valves which completely stop fluid flow and thus piston movement and have to be positively moved off their seatings before the ram can be extended or retracted. Combinations of flow restrictors and lock valves are also used.

However, some commercial vehicle cabs are now fitted with suspension systems allowing the cab to move on resilient supports with respect to the vehicle chassis and when hydraulic ram tilting gear as above described is applied to this type of cab, the ram needs to be "released" when the cab is in the lowered position so that the ram does not interfere with the cab system by acting as heat dissipation and wear that would occur if the ram did act in that manner; and it is the object of the present invention to provide an improved jacking system for suspended cabs and which meets these requirements.

According to the invention the end of the ram cylinder in which the piston is located when the cab is in the lowered position is of increased bore diameter to provide enough clearance around the piston to render the ram passive in this position, the length of the increased cylinder bore being sufficient to accommodate the maximum movement of the cab on its suspension.

The ram piston may be of conventional form with a ring seal and a wear ring, in either order, and the transition in the cylinder wall from the larger to the smaller bore is preferably effected by a tapered bore section to guide the seal into the smaller bore in a correct manner and to avoid pressure shocks and piston wear when the piston moves from one bore section to the other.

Figure 2:
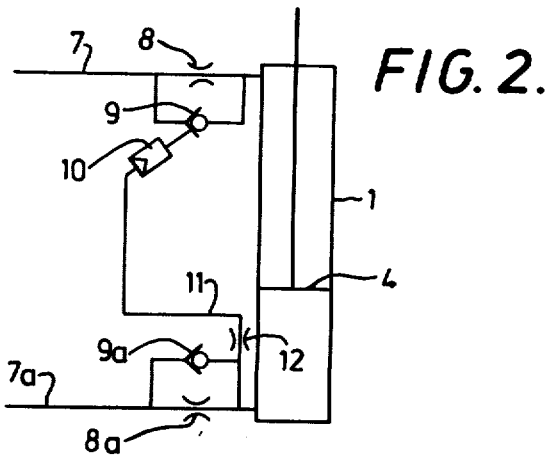
Figure 3:
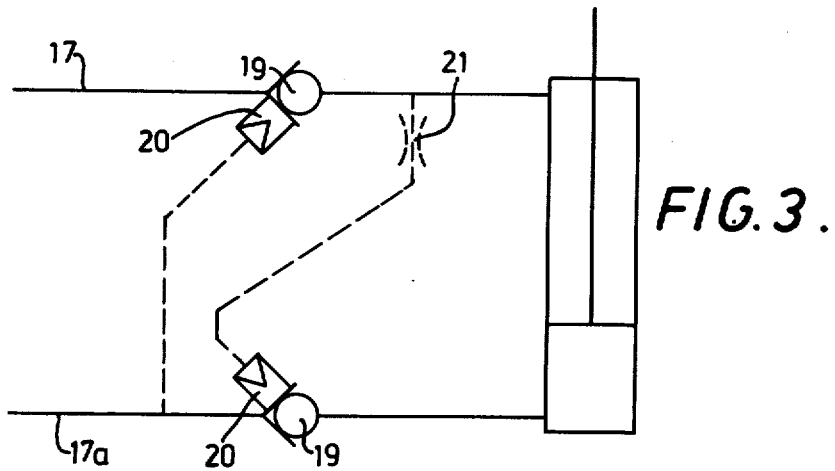
Figure 4:
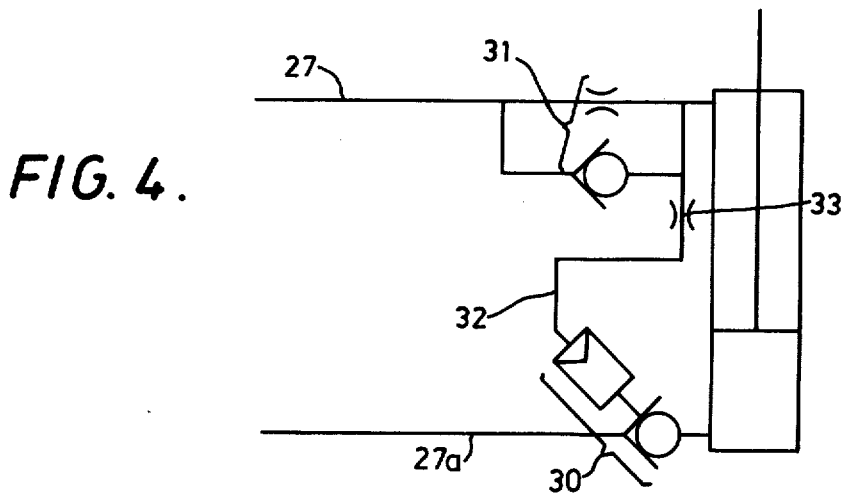

Reference will now be made to the accompanying drawings wherein FIG. 1 is an axial sectional view through a hydraulic ram constructed according to the invention and FIGS. 2-4 are fragmentary circuit diagrams showing respectively applications of the invention to ram systems giving differing arrangements of flow restrictors and lock valves.

Figure 5:
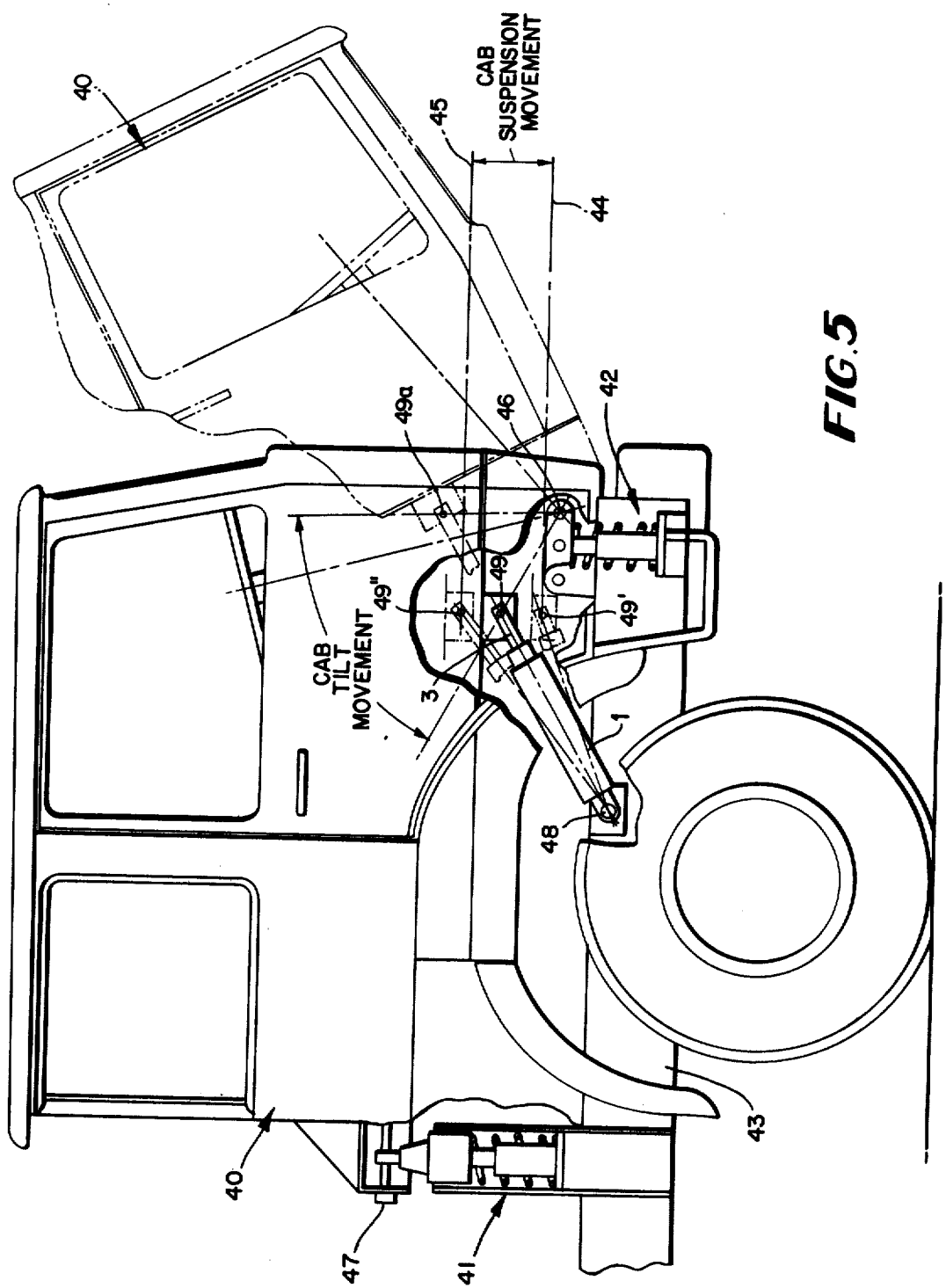

FIG. 5 is a diagrammatic side elevation illustrating the invention in its claimed environment connected between a vehicle chassis and a suspension mounted cab.

Referring first to FIG. 1, the cab-tilting ram illustrated is of conventional form, the ram cylinder 1 being provided at its lower end with an integral lug 2 for pivotal attachment to the vehicle chassis whilst the upper end of the piston rod 3 is adapted in use to have pivotal connection with the cab. A piston 4 fixed on rod 3 has a ring seal 4' and a wear ring 4''. The piston 4 has over the major part of its stroke a sealed sliding fit in the bore 5 of the cylinder but, when the piston is in the suspended position shown, that is, in the lower end of the cylinder and corresponding to the fully lowered position of the cab, it is located in an enlarged bore section 5a, the clearance c around the piston when in this bore section being such as to permit free movement of the piston in both directions, and the length of the bore section 5a being determined by the maximum degree of movement of the cab on its suspension. The bore section 5a is connected to the main bore section 5 by a tapered section 5b which ensures a smooth transition of the piston from one bore section to the other without damage to the piston seal.

The ram of FIG. 1 incorporates flow restrictors and lock valves in accordance with the circuitry shown in FIG. 2, that is, the pressure lines 7, 7a to the upper and lower ends respectively of the ram cylinder each incorporates a uni-directional speed restrictor consisting of a speed restrictor 8 (8a) in parallel with a non-return valve 9 (9a). The non-return valve 9 in the upper pressure line 7 is fitted with an over-ride control 10 responsive to pressure in the line 7a at the cylinder inlet, that is, below the ram piston, the over-ride pressure being transmitted through a line or conduit 11 incorporating a restrictor 12. In particular, the non-return valves 9, 9a are, as shown in FIG. 1, spring-loaded ball valves, the speed restrictors 8, 8a, being constituted by grooves cut in the seatings for the valves and the over-ride control 10 being in the form of a fluid pressure actuated plunger operable to move the ball element 9 off its seating. The line 11 transmitting the over-ride control pressure is in the form of a conduit interconnecting the valve fittings, the restrictor 12 being constituted by a groove in the fitting connected said conduit to the chamber 14 housing the valve element 9a. With this arrangement and with the ram piston descending in the cylinder system the system operates in the normal manner of rams fitted with restrictors but when the piston enters the suspension zone, that is, the enlarged bore 5a, the over-ride control 10 operates to open non-return valve 9, the ram thus presenting no resistance to movement of the cab on its suspension.

A low level of resistance is actually provided by the pressure required to lift the valve 9 from its seat but this pressure can be kept very low so limiting the heat generated by the pumping effect. With the ram operating in the suspended zone, it is necessary to open either both lines 7, 7a or line 7 alone to the reservoir.

To raise the ram piston out of the suspended zone, that is, to tilt the cab, system supply pressure is applied by a control valve either to both upper and lower inlet lines 7, 7a or to the lower line 7a, with the upper line 7 being blocked. The manual pump is then used to raise the ram piston, this being possible by reason of the fact that the effective area of the lower side of the piston exceeds that of the upper side by the area of the piston rod. When the piston enters the main cylinder bore 5, when the effort would become excessive, a relief valve operates causing the control valve to change over to normal raise position where pressurised fluid flows to the lower end of the ram and the upper end is connected to the reservoir. Pumping would then be carried out in the normal manner using the control valve to determine the direction of movement.

FIG. 3 shows the application of the invention to a ram system incorporating a lock valve, that is, a spring-loaded, ball-type check valve 19 movable from its seating by a fluid pressure actuated plunger 20 responsive to an over-ride control, in each inlet line 17, 17a, the lock valve in the pressure or inlet line 17 to the upper end of the ram cylinder being subjected to the over-riding control of the pressure in the pressure or inlet line 17a to the lower end of the ram cylinder, whilst the lock valve in the lower line 17a is subjected as an over-riding control to the pressure in the upper inlet line 17 between its lock valve and the ram cylinder and preferably transmitted through a restrictor 21. With this arrangement, pressure leakage across the ram piston when in the suspended zone, is sensed by the lower lock valve which is thus released and the system freed. To leave the system in the freed condition, it is only necessary to connect the lower inlet line 17a alone, or both upper and lower inlet lines, 17, 17a, to the reservoir.

To raise the ram and the cab through the suspended zone it is again necessary to be able to generate sufficient force by means of the maximum pressure acting on the piston rod area. Again either both inlet lines are connected to pressure or the lower line is connected to the pump with the upper line blocked thus pumping continues until the piston enters the main cylinder bore when the control valve is then set to normal operation, directing pressurised fluid to the lower end of the ram cylinder and connecting the upper end thereof to the reservoir.

It is often the case that over-centre systems need a positive lock valve feature in only one direction of motion. A tilting cab can be very dangerous when falling back and closing the gap between the cab and the chassis but may be unlikely to cause injury when moving up and forwarded at restricted speed. To meet these requirements and in accordance with the invention the hybrid system shown in FIG. 4 is adopted comprising a lock valve 30 as defined in connection with FIG. 3 in the lower inlet line 27a and a unidirectional speed restrictor 31 as defined in connection with FIG. 2 in the upper inlet line 27, the arrangement including an interconnecting pipe 32 by which upper inlet line pressure provides the over-ride control of the lock valve in line 27a to unlock said valve during pump-down and to release the cylinder pressure in the suspended zone, said pipe preferably including a restrictor 33.

It will be understood that instead of the ball-type valves above mentioned spring-loaded shutter or poppet-type valves may be used.

Referring to FIG. 5 a vehicle cab 40 is supported by spring suspension means 41, 42 upon a chassis 43. The cab during vehicle operation is capable of movement relative to the chassis in the range between the levels indicated at 44 and 45, the position when the vehicle is at rest being about midway between those levels. The cab is pivotally mounted on the transverse pivot shown at 46, and may be tilted between the illustrated positions upon release of a latch indicated at 47.

The ram cylinder 1 has lug 2 pivoted on the chassis at 48 and the end of piston rod 3 is pivoted to the cab at 49 as shown for the normal rest position in FIG. 5. The extended position of pivot 49 in the tilted condition of the cab is indicated at 49a. The locations of pivot 49 in the respective lower and upper limits of cab movement on the suspension are indicated at 49' and 49''.

The foregoing construction exceot for that of the ram in accord with the invention is conventional. When the cab is in non-tilted position, the ram is in the condition of FIG. 1 so as not to interfere with suspension action.

We claim:

1. In a hydraulic ram system for tilting a cab that is mounted on a vehicle chassis by a resilient suspension between a first position that the cab normally occupies during vehicle operation and a second lifted position providing access to the engine and/or other components, and wherein a ram assembly comprising a cylinder having a bore containing a sliding piston is adapted to be connected between the cab and the vehicle chassis, characterized by said bore having two different diameter cylindrical sections, with said piston having a sliding sealing fit within the smaller diameter bore section and having substantial radial clearance with the second bore section, said piston being disposed within said second bore section so as to be spaced from the bore wall to render the ram assembly passive when the cab is in said first position, and the axial length of said second bore section being sufficient to accomodate maximum movement of said cab on its suspension in said first position.

2. A hydraulic ram system as claimed in claim 1, wherein there is a fluid pressure inlet line to said bore at each end to apply fluid pressure at opposite sides of said piston and each inlet line is fitted with a unidirectional speed restrictor consisting of a speed restrictor and a non-return valve in parallel, the non-return valve in the inlet line to the smaller diameter bore section being fitted with an over-ride control in the manner of a lock valve and which is responsive to the pressure at the other side of the ram piston.

3. A hydraulic ram system as claimed in claim 2, wherein a restrictor is incorporated in the line conducting the control pressure to said over-ride control.

4. A hydraulic ram system as claimed in claim 1, wherein there is a fluid pressure inlet line to said bore at each end to provide fluid pressure at opposite sides of said piston and each inlet line incorporates a lock valve consisting of a spring-loaded check valve movable from its seating by a fluid pressure-actuated plunger responsive to an over-ride control, the lock valve in the inlet line to the smaller diameter bore section being subjected to the over-riding control of the pressure in the other inlet line while the lock valve in said other inlet line is subjected as an over-riding control to the pressure in the inlet line to the smaller diameter bore section between its lock and the bore.

5. A hydraulic ram system as claimed in claim 4, wherein a restrictor is incorporated in the line conducting over-riding control pressure to the lock valve in the inlet line to the smaller diameter bore section.

6. A hydraulic ram system as claimed in claim 1, wherein the inlet line to the larger diameter bore section incorporates a lock valve and the other inlet line incorporates a uni-directional speed restrictor, said other inlet line pressure providing the over-ride control of the said lock valve.

7. A hydraulic ram system as claimed in claim 6, wherein a restrictor is incorporated in the line conducting over-riding control pressure to said lock valve.

* * * * *